(12) United States Patent
Kawamae et al.

(10) Patent No.: US 6,850,954 B2
(45) Date of Patent: Feb. 1, 2005

(54) INFORMATION RETRIEVAL SUPPORT METHOD AND INFORMATION RETRIEVAL SUPPORT SYSTEM

(76) Inventors: Noriaki Kawamae, No. 202, 1-23-17, Todoroki, Setagaya-ku, Tokyo (JP), 158-0082; Hiroshi Yasuda, 2-27-20, Hongodai Sakae-ku, Yokohama-shi, Kanagawa (JP), 247-0008; Terumasa Aoki, 1-7-2, Kitano, Kamifukuoka-shi, Saitama (JP), 256-0007

( * ) Notice: Subject to any disclaimer, the term of this patent is extended or adjusted under 35 U.S.C. 154(b) by 402 days.

(21) Appl. No.: 09/905,993

(22) Filed: Jul. 17, 2001

(65) Prior Publication Data

US 2002/0133726 A1 Sep. 19, 2002

(30) Foreign Application Priority Data

Jan. 18, 2001 (JP) ........................................ 2001-010086

(51) Int. Cl.[7] .............................................. G06F 17/30
(52) U.S. Cl. .................................... 707/104.1; 707/100
(58) Field of Search ............................. 707/104.1, 100, 707/3–5, 101

(56) References Cited

U.S. PATENT DOCUMENTS

| | | | | |
|---|---|---|---|---|
| 5,404,514 A | * | 4/1995 | Kageneck et al. | .............. 707/5 |
| 5,418,948 A | * | 5/1995 | Turtle | ............................ 707/4 |
| 5,805,911 A | * | 9/1998 | Miller | .......................... 715/534 |
| 6,023,706 A | * | 2/2000 | Schmuck et al. | ............ 707/200 |
| 6,226,638 B1 | * | 5/2001 | Okura et al. | ..................... 707/5 |
| 6,292,795 B1 | * | 9/2001 | Peters et al. | ..................... 707/3 |
| 6,292,802 B1 | * | 9/2001 | Kessenich et al. | ........... 707/101 |
| 6,523,028 B1 | * | 2/2003 | DiDomizio et al. | ............ 707/5 |
| 6,662,152 B2 | * | 12/2003 | Sako et al. | ...................... 704/9 |

* cited by examiner

*Primary Examiner*—Safet Metjahic
*Assistant Examiner*—CamLinh Nguyen
(74) *Attorney, Agent, or Firm*—Griffin & Szipl, P.C.

(57) ABSTRACT

A set of keyword candidates having orientation, with keywords input by a user as an origin, is appropriately presented. An information retrieval support system 10, for presenting candidate words to be subsequently input to input words, comprises a search sequence creation section 34 for creating a search sequence of a set of input words input by a user arranged in chronological order, a search sequence DB 36 for storing storage sequences, a hash creation section 38 for creating a hash that has keyed particular input words based on stored sequences, a hash DB 40 for storing created hashes, a hash acquisition section 44 for acquiring a hash for keying the input words from the hash database in response to input words supplied via a search engine 31, an index calculating section 46 for calculating an index relating to words contained in a hash, and a directory creation section 48 for creating a word directory by arranging the input words in a word directory for the keys roots when the words satisfy a specified condition, wherein the created word directory is output.

16 Claims, 12 Drawing Sheets

FIG. 10

| SEARCH OPERATION | SUITABLE INDEX |
|---|---|
| (1):CHANGE/UPDATE | infre |
| (2):REPRESENTATION CHANGE | avema |
| (3):INSTANTIATION | aveaa |
| (4):ABSTRACTION | avaba |
| (5):REPLACEMENT | infre |
| (6):ADDITION | infre |

# INFORMATION RETRIEVAL SUPPORT METHOD AND INFORMATION RETRIEVAL SUPPORT SYSTEM

TECHNICAL FIELD

The present invention relates to a retrieval support system using keywords, and more particularly, relates to a retrieval support system that can utilize retrieval of web sites on the Internet.

RELATED ART

An information space utilizing the www (World Wide Web) is continuing to expand day by day, and likewise needs with respect to systems (retrieval systems) for a user to retrieve desired web sites are also increasing significantly in proportion to the expansion of the information space. However, accompanying the increase in the amount of information being handled, in the retrieval systems of the related art it is difficult to support optimization of a user's retrieval activity.

In existing retrieval systems, a user inputs keywords, the system executes retrieval based on an index stored in a previously created internal database etc. with respect to documents previously existing in the www information space, and a list of URLs of documents matching the index is presented to the user as a list of retrieval results. However, since it is necessary for the user to decide and input the keywords themselves, the retrieval operation has certain difficulties when retrieving articles outside the users area of specialization or when the user does not know specifically what to search for.

Taking the difficulty of the above described retrieval operation into consideration, in order to support retrieval by a user, it has been considered to estimate the level to which retrieval requests and strategic information relating to users is made common by passing individual isolated retrieval activities through a log stored in the retrieval system.

IP addresses as means for identifying a user, keywords used in retrieval and URLs of web pages to be referred to from the retrieval results for those keywords are stored in the log. Accordingly, by ascertaining a correlation between keywords based on this log, it is possible to p resent the user with a list of keywords (keyword candidates) that have a possibility of being input next.

However, finding valid keyword candidates from a vast user log is difficult, and currently other keywords that appear to have a large correlation from the main keywords are made to correspond in advance in a manual operation, and the only practical implementation is presenting this to the user.

Also, due to the spread of shopping arcades on the Internet, users have become able to purchase various product via the Internet, but it is not easy to find the desired product from among a vast amount of products.

The object of the present invention is to provide a system that presents a group of keyword candidates having orientation with keywords input by a user as a starting point, and that is capable of supporting the acquisition of desired information by the user appropriately updating or adding keywords.

DISCLOSURE OF THE INVENTION

The object of the present invention is achieved by an information retrieval support method for presenting candidate words to be input after an input word, comprising a step of storing a group of input words, that have been input as a target for the user, as sequences in a sequence database, a step of storing a certain words in a hash database made up of keyed hashes based on the stored sequences, a step of acquiring hashes to key the appropriate input words from the hash sequence database in response to words input by the user, a step of calculating an index relating to words constituting the hash, a step of arranging the appropriate words in a word directory whose root corresponds to the keyed word in the event that the appropriate words satisfy a specified condition, and a step of outputting the created word directory.

According to the present invention, a search sequence is extracted in advance from a user log or the like, and a hash is created based on this search sequence. If a search word used when a particular user is performing retrieval is received, candidate words to be used in forming candidates for the next search word are arranged inside a directory and a completed word list is output. Accordingly, it is then possible for a user to refer to candidate words in the word list presented to easily perform more subject-oriented retrieval.

In a preferred embodiment, a hash has words following a word constituting a key within a sequence as its elements, an index has a posterior probability $P(\text{words}_i|(\text{KEY}))$ expressing an appropriate word "$\text{word}_i$" when a key "KEY" is known and a prior probability $P(\text{word}_i)$ expressing before the key is known, and a condition is that the posterior probability $P(\text{word}_i|\text{KEY}) > $ the prior probability $P(\text{word}_i)$.

The preferred embodiment of the present invention also comprises a step of receiving information representing the user's retrieval operation, and a step of selecting a suitable index according to the information. In this way, it is possible to present appropriate candidate words according to the user's search operation.

The above described operation index preferably has any off (1) a change or update indicating a change in interest by the user; (2) a representation change indicating that word representation has changed; (3) instantiation indicating that a word to be input next will instantiate a preceding input word; (4) abstraction indicating that a word to be input next will abstract a preceding input word; (5) replacement indicating that there has been replacement in the same concept layer; and (6) addition indicating addition of words.

More preferably, an index indicating the number of items using keywords in a hash for keying input words is used with respect to (1), (5) and (6) described above, a cumulative number of positions where a keyword containing that hash appears within a retrieval sequence, for the key, is used as the index with respect to (2) described above, an average of positions where keywords containing that hash appears after the retrieval sequence is used as the index with respect to (3) described above, and an average of positions where keywords containing that hash appears before the retrieval sequence is used as the index with respect to (4) described above.

The object of the present invention is also achieved by an information retrieval support method, for presenting candidate words to be subsequently input for input words, comprising a step of storing a set of input words input by a user in a sequence database as a sequence, a step of storing a hash that has keyed the selected input words in the created hash database based on the stored sequence, a step of acquiring a hash for keying the input words from the hash database in response to words input by the user, a step of arranging the words in a word directory whose root is the keyed word when the words satisfy a specified condition, a step of outputting the created word directory, a step of receiving information indicating a retrieval operation of the user upon a user referencing the word directory, a step of selecting an appropriate index in accordance with the information, a step of calculating a selected index with respect to words contained in the hash, a step of creating a retry word directory again by arranging the words, in the word directory whose root corresponds to the keyed word, when the words satisfy the specified condition, and a step of outputting the recreated word directory.

Further, the object of the present invention is achieved by an information retrieval support method for presenting candidate words to be subsequently input for input words, comprising a step of creating a hash made up of sets of input words used to retrieve a particular item and storing this hash in a database, a step of acquiring a hash for keying the input words from the hash database in response to words input by the user, a step of calculating an index indicating co-occurrence relation after input with respect to words contained in the hash, a step of arranging the words in a word directory whose root corresponds to the keyed word as a candidate word for adding the words to input words, in the event that the words satisfy a specified condition, and a step of outputting the created word directory.

The object of the present invention is also achieved by an information retrieval support system, for presenting candidate words to be subsequently input for input words, comprising retrieval sequence creation means for creating a retrieval sequence of a set of input words input by a user arranged in chronological order, a retrieval sequence database for storing storage sequences, a search sequence database for storing search sequences, hash creation means for creating a hash that has keyed particular input words based on sequences stored in the retrieval sequence database, hash acquisition means for acquiring a hash for keying the input words from the hash database in response to word input by the user, index calculating means for calculating an index relating to words contained in a hash, and directory creation means for creating a word directory by arranging the input words in a word directory whose root corresponds to the keyed word when the words satisfy a specified condition, wherein the created word directory is output.

The object of the present invention is also achieved by an information retrieval support system, for presenting candidate words to be subsequently input as input words, comprising hash sequence creation means for creating a hash made up of a set of input words used to retrieve a particular item, a hash database for storing created hashes, hash acquisition means for acquiring a hash for keying the input words from the hash database in response to words input by the user, index calculating means for calculating an index indicating a co-occurrence relationship subsequent to input, and word directory creation means for creating a word directory by arranging candidates of words for adding the words to input words in a word directory whose root corresponds to the keyed word when the words satisfy a specified condition.

The object of the present invention is also achieved by a program causing a computer to execute a program containing an information retrieval support method.

BRIEF DESCRIPTION OF THE DRAWINGS

FIG. 10 is a drawing showing a suitable index for a retrieval operation of this embodiment.

PREFERRED EMBODIMENTS OF THE INVENTION

Figure 1:
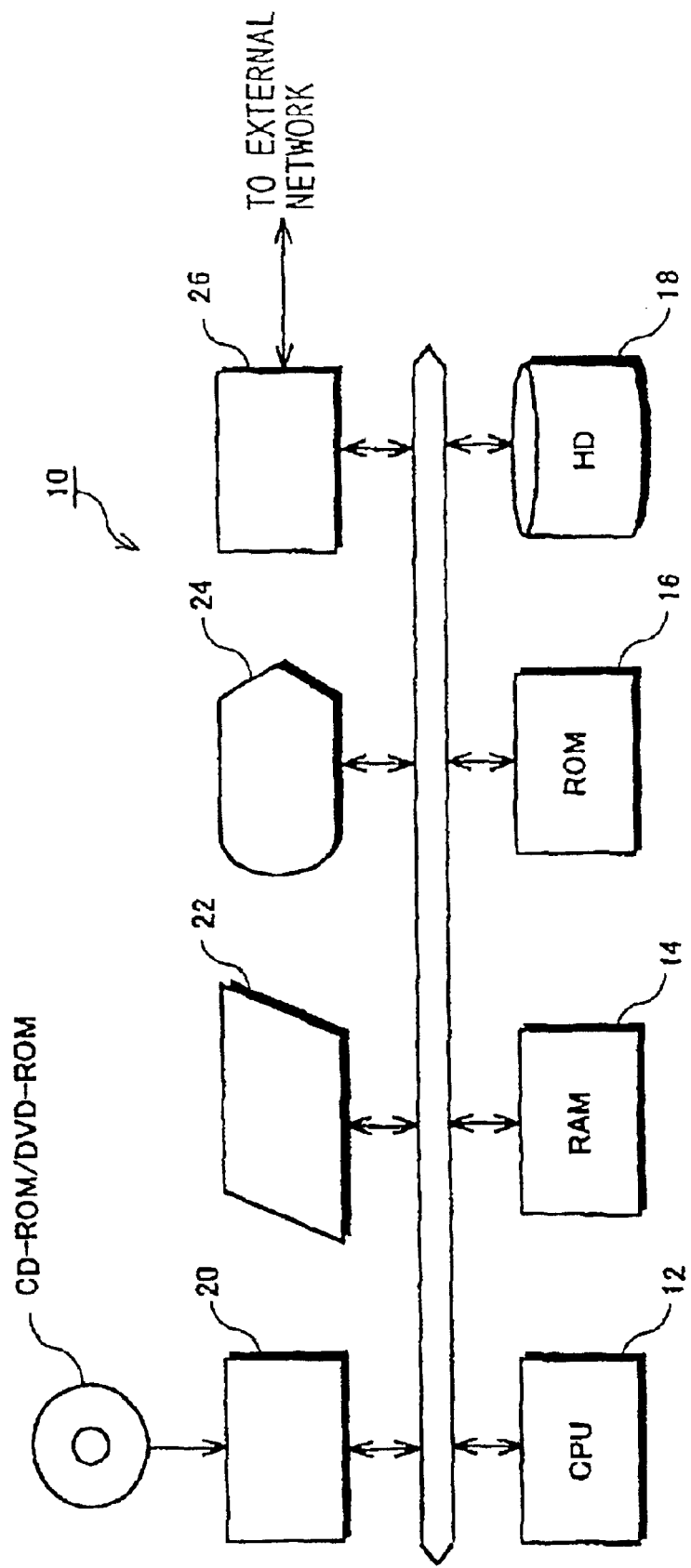
FIG. 1 is a block diagram showing the hardware structure of an information retrieval support system of an embodiment of the present invention.
Figure 2:
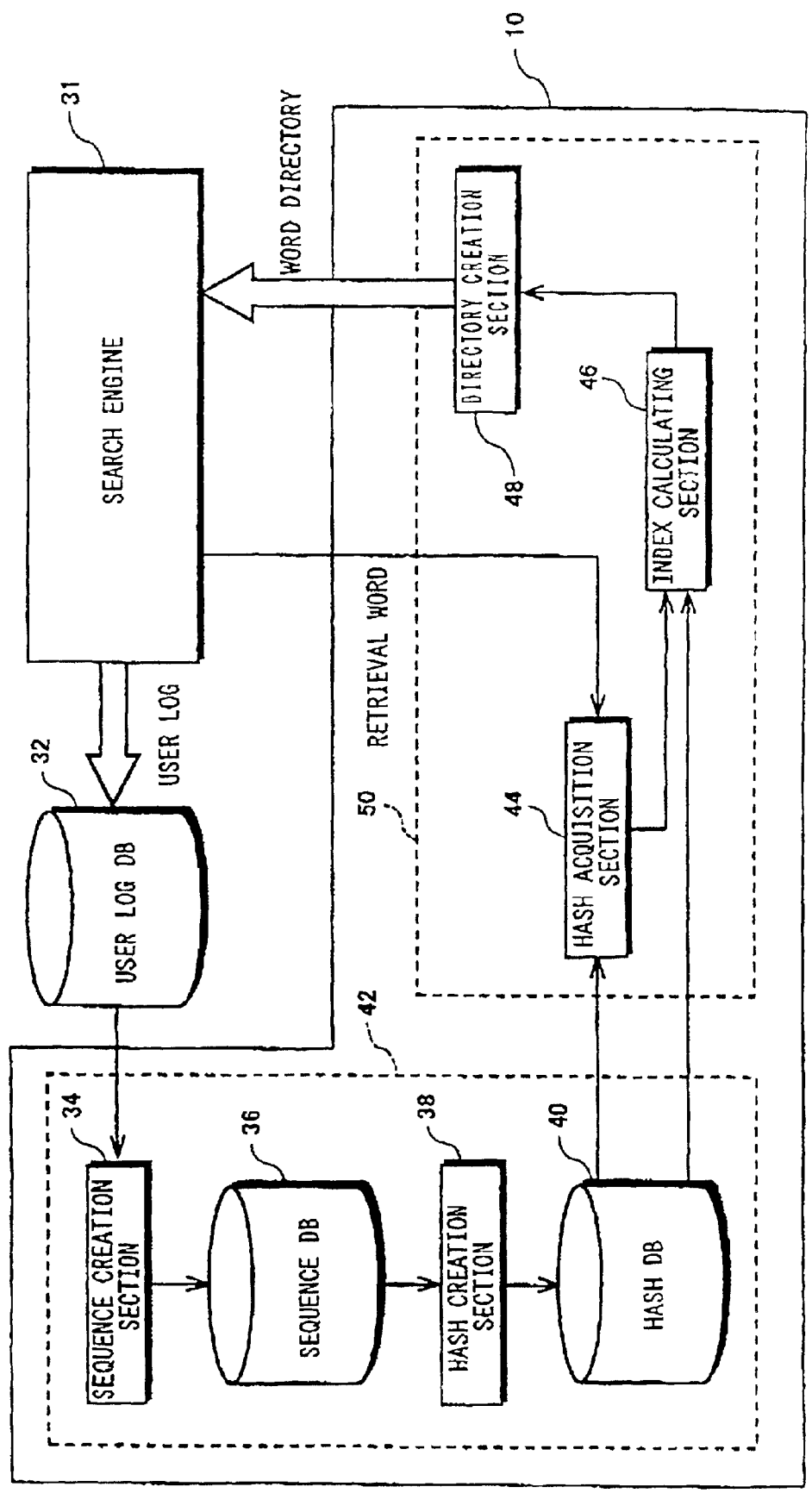
FIG. 2 is a block diagram showing functions of the information retrieval support system of the embodiment.

A description will now be given of embodiments of the present invention, with reference to the attached drawings. FIG. 1 is a block diagram showing the hardware structure of an information retrieval support system of an embodiment of the present invention, and FIG. 2 is a block diagram showing functions of the information retrieval support system. As shown in FIG. 1, the retrieval system 10 of this embodiment comprises a central processing unit (CPU) 12, RAM 14, ROM 16, a hard disc device 20 for storing databases etc., a removable storage medium drive 20, such as CD-ROM or DVD, an input device 22 such as a keyboard or a mouse, a display such as a CRT or LCD, and a communication controller 26 for controlling communication with an external network. Specifically, it is possible to use a database server or the like as the retrieval system 10.

The retrieval support system itself has a search engine function and can be configured so as to receive a user's search words via an external network such as the Internet, search a large scale database, and present a list of web pages containing the user's search words. However, in this embodiment, the retrieval support system 10 is constructed separately from a search engine and is configured so as to receive specified information from the search engine, execute necessary processing, and return processing results to the search engine.

In FIG. 2, the retrieval support system 10 of this embodiment acts in cooperation with the search engine 31 to present the user with a word directory containing candidate words from search words input by the user. The search engine 31, for example, stores a user log supplied via an external network such as the Internet in a user log database (DB) 32. The user log DB 32 can be provided on the search engine 31 side, or provided on the retrieval support system 10 side. The user log DB 32 can be provided on the search engine 31 side, or provided on the retrieval support system 10 side. In this embodiment, the user log DB 32 is provided on the search engine 31 side.

Figure 3:
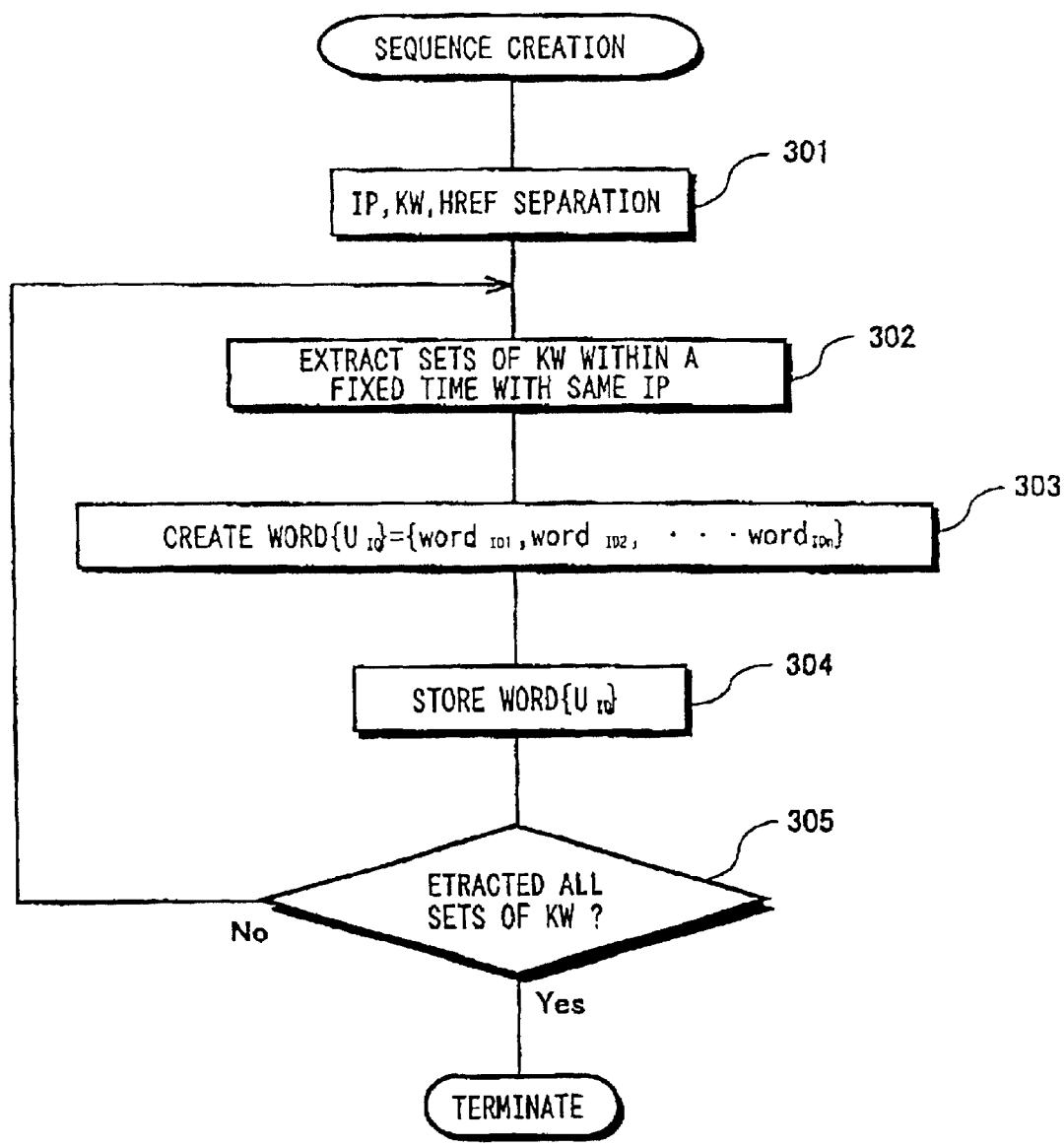
FIG. 3 is a flowchart showing processing executed by preprocessing sections of the embodiment.

As shown in FIG. 3, the retrieval support system 10 comprises a sequence creation section 34 for reading out from the user log DB 32 to create a sequence of search words input by a user (retrieval sequence), a sequence DB 36 for storing the created sequences, a hash creation section 38 for reading out stored retrieval sequences to create a specified hash, and a hash DB 40 for storing the created hashes. Sections from the sequence creation section 34 to the hash DB 40 will be referred to as a preprocessing section 42. Data required for calculation using sections to be described later are arranged in the preprocessing section 42 based on information stored in the user log DB 32.

The retrieval support system 10 comprises a hash acquisition section 44 receiving search words input by a user to read out a required hash from the hash DB 40, an index calculating section 46 for calculating a required index based on the acquired hash, and a directory creation section 48 for creating a word directory made up of candidate keywords according to the acquired index. Sections from the hash acquisition section 44 to the directory creation section 48 will be referred to as a candidate keyword designation section 50. The candidate keyword designation section 50 functions by receiving search words from the search engine 31.

Before describing the operation of the retrieval support system 10 constructed as described above, a simple description will be given of the principal of the present invention. The present invention creates retrieval sequences that are strings of search words for a user to search on a desired subject, stores the retrieval sequences, creates a hash, that will be described later, based on the stored retrieval sequences, and extracts keyword candidates that are related to particular search words.

The retrieval sequences are hashes having keywords keyed in and used by a user stored in chronological order, and have the following structure.

$$\text{word}\{U_{ID}\} = \{\text{word}_{ID1}, \text{word}_{ID2}, \ldots \text{word}_{IDn}\}$$

where, $U_{ID}$: sequence of a particular identifier ID $\text{word}_{IDn}$: keywords input within a specified time Utilizing the principal of the present invention, first of all each keyword of the above described sequence is keyed in, and a hash is created as shown below.

$$\text{From}\{\text{key}\} = \{\text{word}_{IDi}, \text{fre}\{\text{word}_{IDi}\}, \text{count}\{\text{word}_{IDi} | \text{key}\} \ldots \}$$

where, key: keyed in search word $\text{word}_{IDi}$: search word used in following key $\text{fre}\{\text{word}_{IDi}\}$: frequency of use of (number of people using) $\text{word}_{IDi}$ $\text{count}\{\text{word}_{IDi} \text{ key}\}$: number of items changed from key to $\text{word}_{IDi}$, namely number of users that have used $\text{word}_{IDi}$ within the hash of the search word "key"

A hash called From indicates that the search word has been changed from the search word highlighted "key" to $\text{word}_{IDi}$. For example, if a search word sequence from a user is $\text{word}\{U_{ID}\} = \{\text{cheese, parmesan cheese}\}$ then it is possible to acquire a hash called From{cheese}={parmesan cheese ... }.

Here, by carrying out the same processing for all retrieval sequences, it is possible to acquire the hash described below.

From {cheese}={$\text{word}_{IDi}$, fre{$\text{word}_{IDi}$}, count{cheese |$\text{word}_{IDi}$} ... }

By acquiring the hash highlighted in a keyword change inside the retrieval sequence, a probability distribution of subsequent words is acquired for every start key (that is search words initially used when at the time of retrieval).

As a result, a keyword transition prediction for the case where a particular search word "A" is a start key is carried out, and Bayes' formula becomes applicable.

$$P(C_i|A) = P(A|C_i)P(C_i)/\Sigma P(A|C_i)P(C_i) \quad (1)$$

Where: $C_i$ is the $i^{th}$ subsequent search word $P(C_i|A)$: probability of changing to search word "$C_1$" when user has used search word "A"

$P(C_i)$: probability of selecting search word $C_i$ $P(A|C_i)$: probability that search word "A" has been used before changing to search word "$C_i$"

$$P(C_i) = \text{fre}\{CC_i\}/\Sigma \text{fre}(C_i)$$

$$P(A|C_i) = \text{count}(C_i|A)/\text{fre}(C_i)$$

The equation (1) above indicates that the probability of the appearance of a keyword "$C_i$" subsequent to the start word "A" is influenced by that start word "A", and a quantitative relationship is determined by the conditional probability distribution $P(C_i|A)$. A keyword set $C_i$, in a hash of a start word "A", has various probabilities of appearance. As an example the case where an initially input search words is "A" and keywords input by a user after that are $C_i$, and A (in the case of no change) is shown in table 1.

TABLE 1

| $C_i$ | Count ($C_i$ | A) | P ($C_i$ | A) | P ($C_i$) | P ($C_i$)/0.05 |
|---|---|---|---|---|
| C1 | 25 | 0.25 | 0.01 | 0.2 |
| C2 | 10 | 0.1 | 0.01 | 0.2 |
| C3 | 5 | 0.05 | 0.005 | 0.1 |
| A | 60 | 0.60 | 0.025 | 0.5 |
| Total | 100 | 1.0 | 0.05 | 1.0 |

If probability (posterior probability) $P(C_i|A)$ in the case where the search word "A" is known is larger than the probability before it is known (prior probability), it is determined that it is suitable as a change keyword for "A". In the case of table 1, by knowing the search word "A", since the posterior probability of keyword "C1" becomes higher than the prior probability, this keyword "C1" is judged as a candidate keyword for the search word "A", and the search word "A" is inserted into a word directory as a root word.

With respect to the principle of the present invention described above, fre and count(=infre) are calculated in advance as a hash, but with this embodiment, first of all a simple hash is created, and an index for necessary fre and count etc. is calculated in response to search words input.

Figure 4:
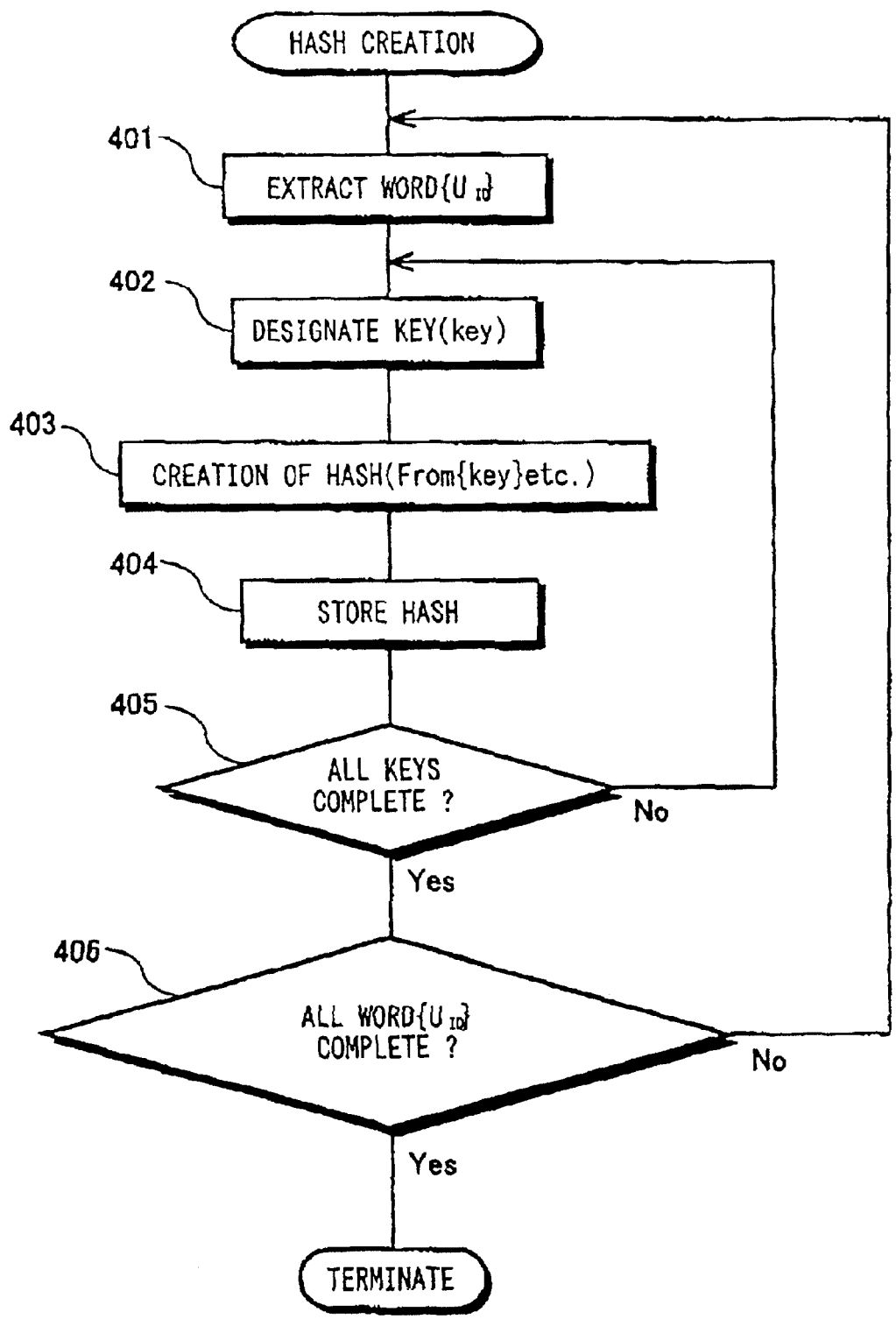
FIG. 4 is a flowchart showing processing executed by preprocessing sections of the embodiment.

FIG. 3 and FIG. 4 are flowcharts showing processing executed by preprocessing sections 42. FIG. 3 shows sequence creation processing performed by the sequence creation section 34. As shown in FIG. 3, if the sequence creation section 34 acquires a required user log from the user log DB 32, this user log is separated into a keyword group (KW) and a HREF. A client side (user side) IP address and KW are a keyword group used in a search by the user, while HREF is a URL of a www page that a user browses to from retrieval results output by that keyword.

Next, the sequence creation section 34 extracts a keyword group input within a specified time (for example, within 20 minutes) for each IP address (step 302). In this way, it is possible to search words input by a particular user for a particular purpose. By arranging the keywords extracted in step 302 in chronological order, it is possible to acquire a search sequence from a particular user (step 303).

As previously described, this search sequence takes the form of:
word $\{U_{ID}\}=\{word_{ID1}, word_{ID2}, \ldots, word_{IDn}\}$ The acquired search sequence is stored in the sequence DB 36 (step 304). This kind of processing is executed for all of the keyword groups (refer to step 305).

If the search sequence is stored in the sequence DB 36, processing shown in FIG. 4 is executed by the hash creation section 38, a required hash is generated and this hash is stored in the hash DB 40. In more detail, the hash creation section 38 reads out a particular search sequence word $\{U_{ID}\}$ from the sequence DB 36 (step 401), and designates search words constituting keys (step 402). Next, a hash relating to the keys is created. In the first embodiment, From {key} is created. In the first embodiment, the hash is simplified to create $$\text{From } \{key\}=\{word_{IDi}\}$$

where words$_{IDi}$ search words to follow the search word "key".

The acquired hash is stored in the hash DB 40. For each search words in the search sequence, processing of steps 402–404 continues until the above described hash is created.

For example, with a search sequence such as word $\{U_{ID}\}=\{$food, Japanese food, raw fish, sushi eel, grilled eel$\}$ by keying respective search words it is possible to acquire the following hash:

From{food}={Japanese food}
From{Japanese food}={raw fish}
From{raw fish}={sushi}
From{sushi}={eel}
From{eel}={grilled eel}

Also, the processing in steps 401–406 is carried out for all search sequences (refer to step 406). In this way, processing by the preprocessing section 42 is completed upon storing the required hash in the hash DB 40.

Figure 5:
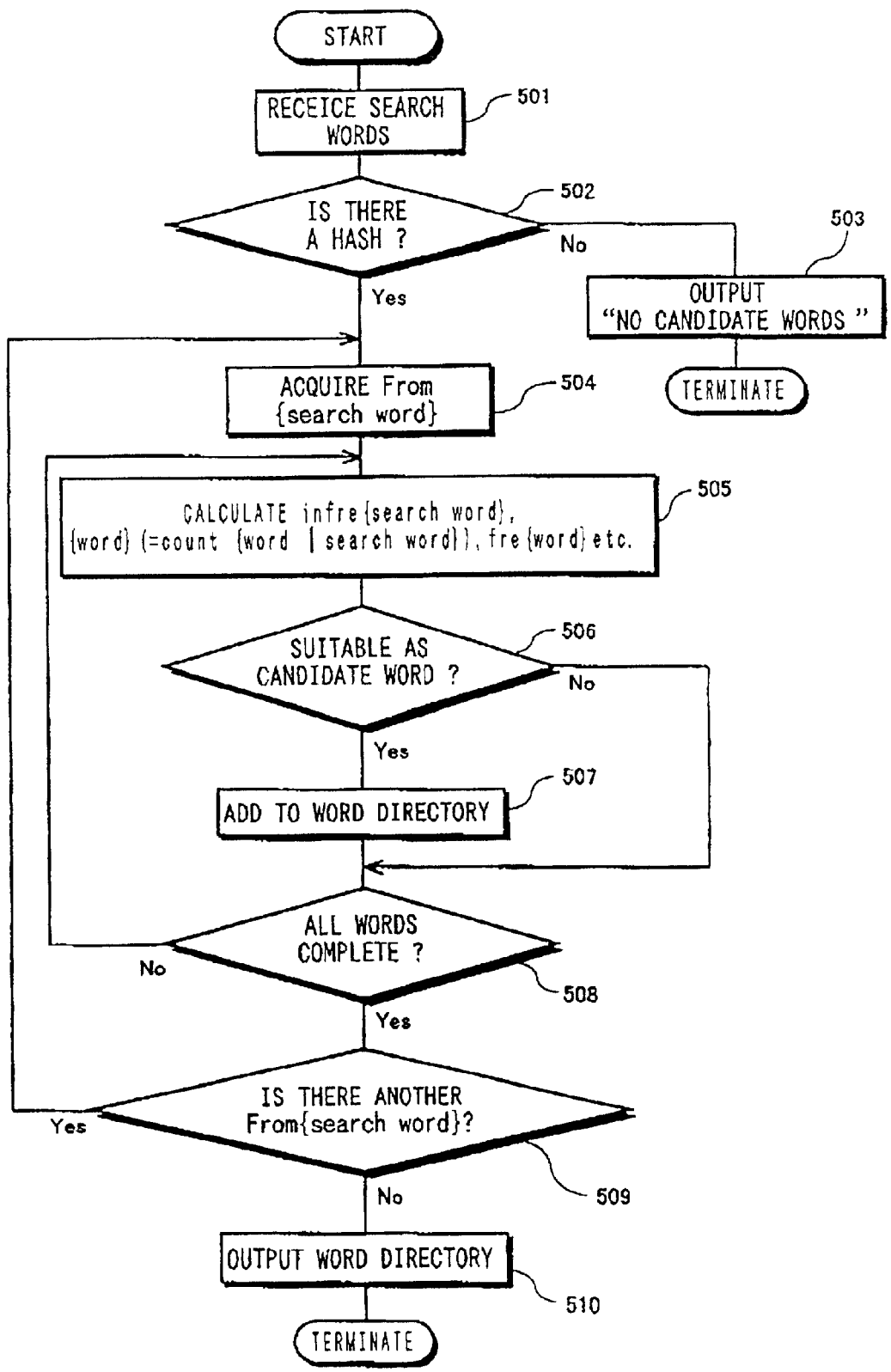
FIG. 5 is a flowchart showing processing using a candidate keyword designating section of the embodiment.

A description will now be given of processing of the candidate keyword designation section 50. FIG. 5 is a flowchart showing processing by the candidate keyword designation section 50. As shown in FIG. 5, if search words are supplied from the search engine 31 to the hash acquisition section 44 (step 501), the hash acquisition section 44 searches the hash DB 40 and determines whether or not a hash exists containing the search words (step 502). In this embodiment, for example, in the case of supplying a search word "cheese", it is judged whether or not a hash "From{cheese}=" exists.

If a hash does not exist, (No in step 502), the directory creation section 48 outputs data representing "no candidate words" to the search engine 31, and processing is terminated (step 503).

On the other hand, if a hash does exist, (Yes in step 502), the hash acquisition section 44 acquires the above described hash ("from{search word}=") (step 504).

Next, the index calculating section 46 calculates various indexes relating to the acquired hash (step 505). In the first embodiment, more concretely, infre {search word}, {word} (=count {search word |word}), fre{word} etc. are calculated. As has been described with respect to the principle of the present invention, in the first embodiment, if P(word |search word), being the probability (posterior probability) that a keyword "search word" is known, is larger than the probability (prior probability) P(word) before it is known, it is judged that a single word "word" is suitable as a keyword to be changed from "search word" (changed keyword). Accordingly, for respective From{search word}={word}, it is judged whether or not P(word |search word)>P(word).

In the case where it has been judged that the above mentioned "word" is suitable as a candidate keyword (Yes in step 506), the directory creation section 48 adds this "word" to the word directory as a candidate keyword to be a subsequent search word (step 507). On the other hand, when it has been judged as not suitable (No in step 506), the processing corresponding to the above described step 507 is not executed.

Figure 6A:
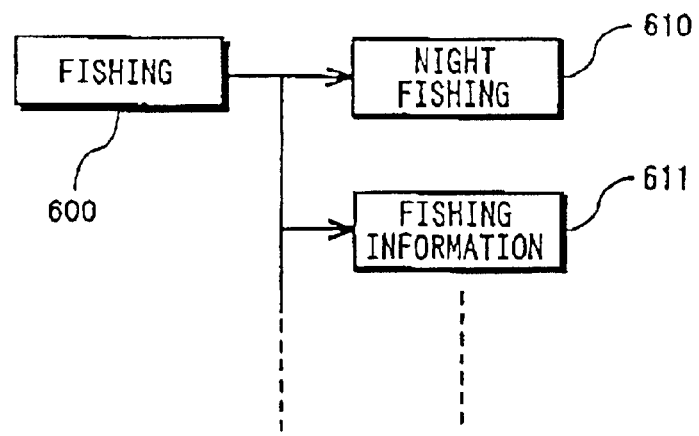
FIGS. 6A and 6B are drawings each showing an example of a word directory of the embodiment.

After the above described processing has been executed for the From {search word} hash (refer to step 508), the directory creation section 48 outputs the completed word directory to the search engine 31 (step 509). FIG. 6A is a drawing showing a word directory created in this way for a search word "fishing" (refer to reference numeral 600). Here, it is determined that "night fishing" (see reference numeral 610), "fishing information" (see reference numeral 611), . . . , are suitable as candidate keywords for the above described word "fishing", and they are added to the word directory.

Figure 6B:
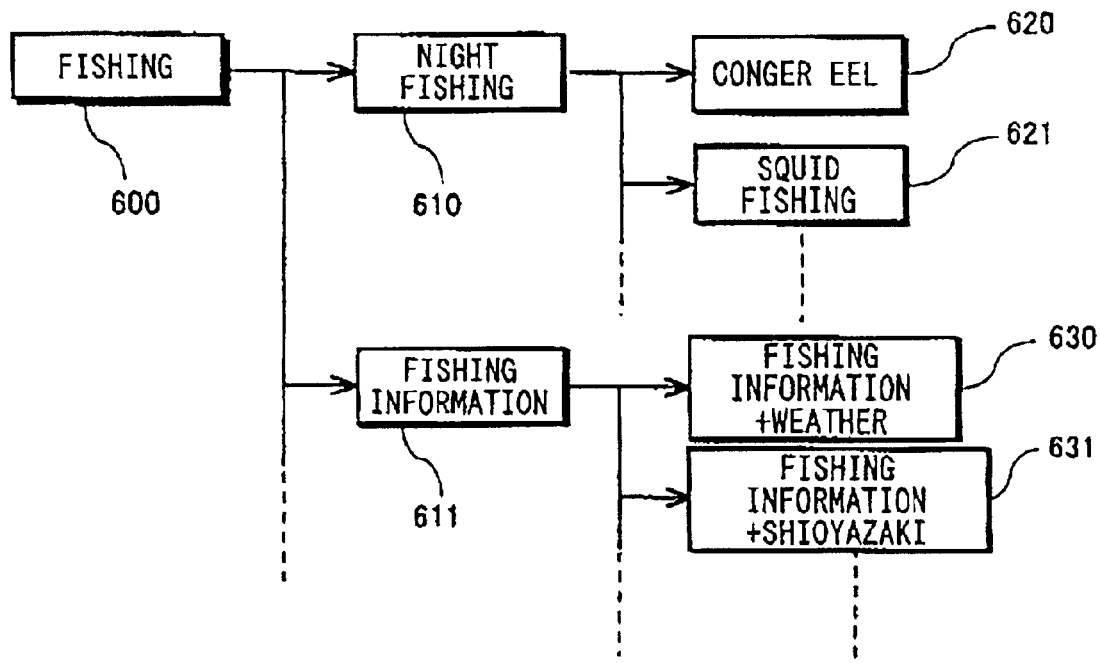

Also, as shown in FIG. 6B, it is also possible to create candidate words positioned below words such as "conger eel" (see reference numeral 620), "squid fishing" (see reference numeral 621), . . . , etc. in the word directory, by subjecting "night fishing" as a search word to the processing shown in FIG. 5. Creation of the candidate words (see reference numerals 630, 631) positioned below "fishing information" (see reference numeral 611) shown in FIG. 6B will be described later.

In this way, according to this embodiment hashes relating to keywords constituting keys are created, specified indexes are calculated based on hashes containing search words input by a user in order to search, and acquired indexes that satisfy a specified condition are added to the word directory as candidate words to be subsequent search words. Accordingly, by being presented with the word directory, it is possible for a user to more easily understand what it is they wish to search for themselves. For example, there is a large possibility of the item the user is searching for being included in words in the presented word directory, In this way, it becomes possible for a user to more easily carry out a retrieval operation.

Next a description will be given of a second embodiment of the present invention. In the first embodiment, a hash From was used, and indexes called infre and fre were used to select candidate words, but in the second embodiment, other hashes are used, and it is possible to select a suitable index according to the user's retrieval operation.

Figure 7:
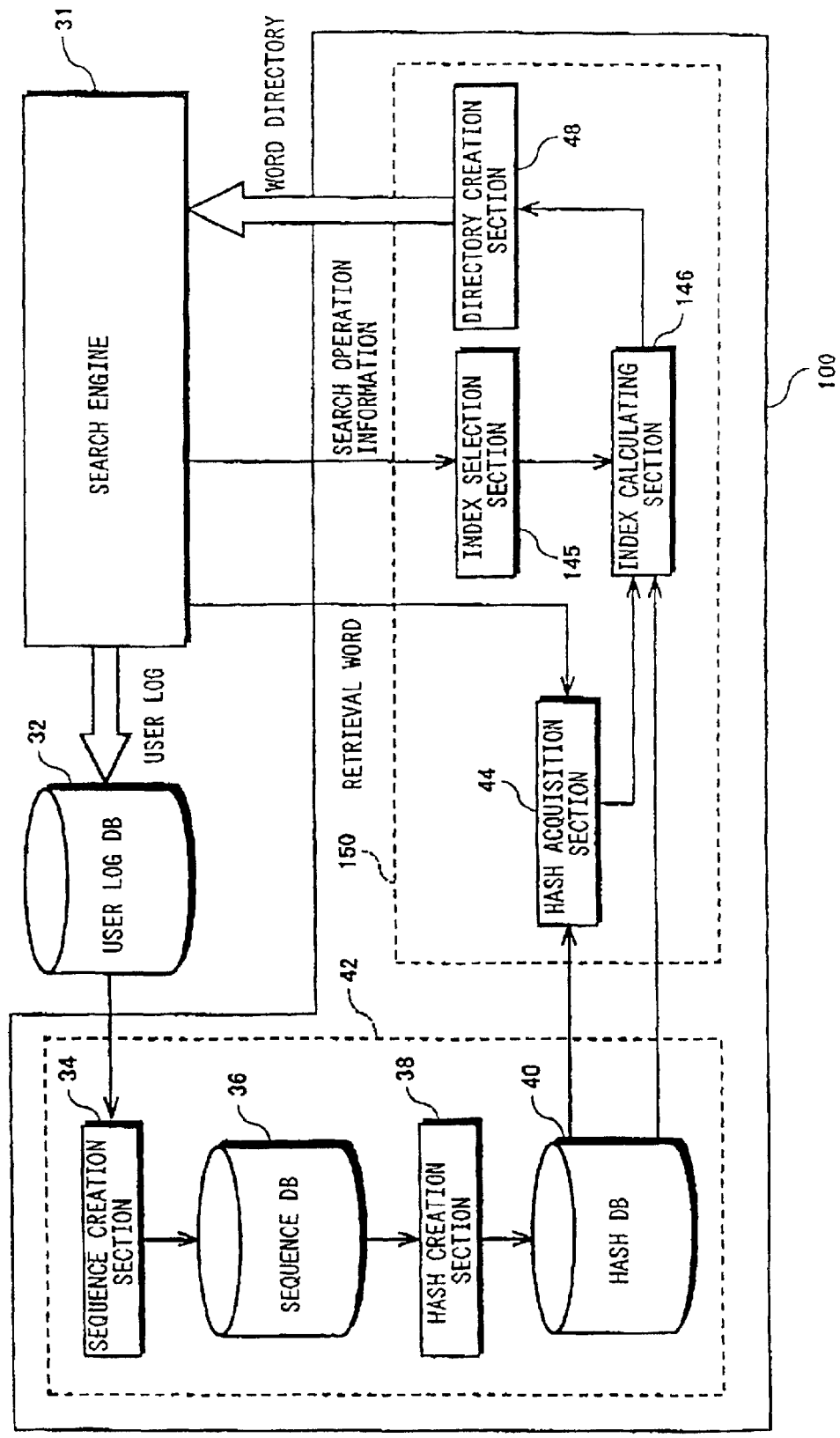
FIG. 7 is a block diagram showing functions of the information retrieval support system of a second embodiment.

FIG. 7 is a block diagram of functions of the information retrieval support system of the second embodiment. In FIG. 7 parts that are the same as in the first embodiment have the same reference numerals attached thereto. As shown in FIG. 7, the search support system 100 of the second embodiment has a preprocessing section 42 comprising the sequence creation section 34, sequence DB 36, hash creation section 38 and hash DB 40. In the preprocessing section 42, the hash created in the hash creation section 38 is different from that of the first embodiment.

Also, the candidate keyword designation section 150 comprises the hash acquisition section 44, an index selection section 145, an index calculating section 146 and the directory creation section 48. In the candidate keyword designation section 150 the index selection section 145 is added, and an index designated in an instruction from the index selection section 145 is calculated in the index calculating section 146.

In this embodiment, the hash creation section 38 creates a hash Con containing all keywords contained in a search sequence, based on the search sequence. For example, in the case where a retrieval sequence is word $\{U_{ID}\}$={food, Japanese food, raw fish, sushi, eel, grilled eel} if a key is made "raw fish" then a hash called Con{raw fish}={food, Japanese food, raw fish, sushi, eel, grilled eel} can be obtained. This hash Con can be considered to be highlighting co-occurrence of keywords.

Figure 8:
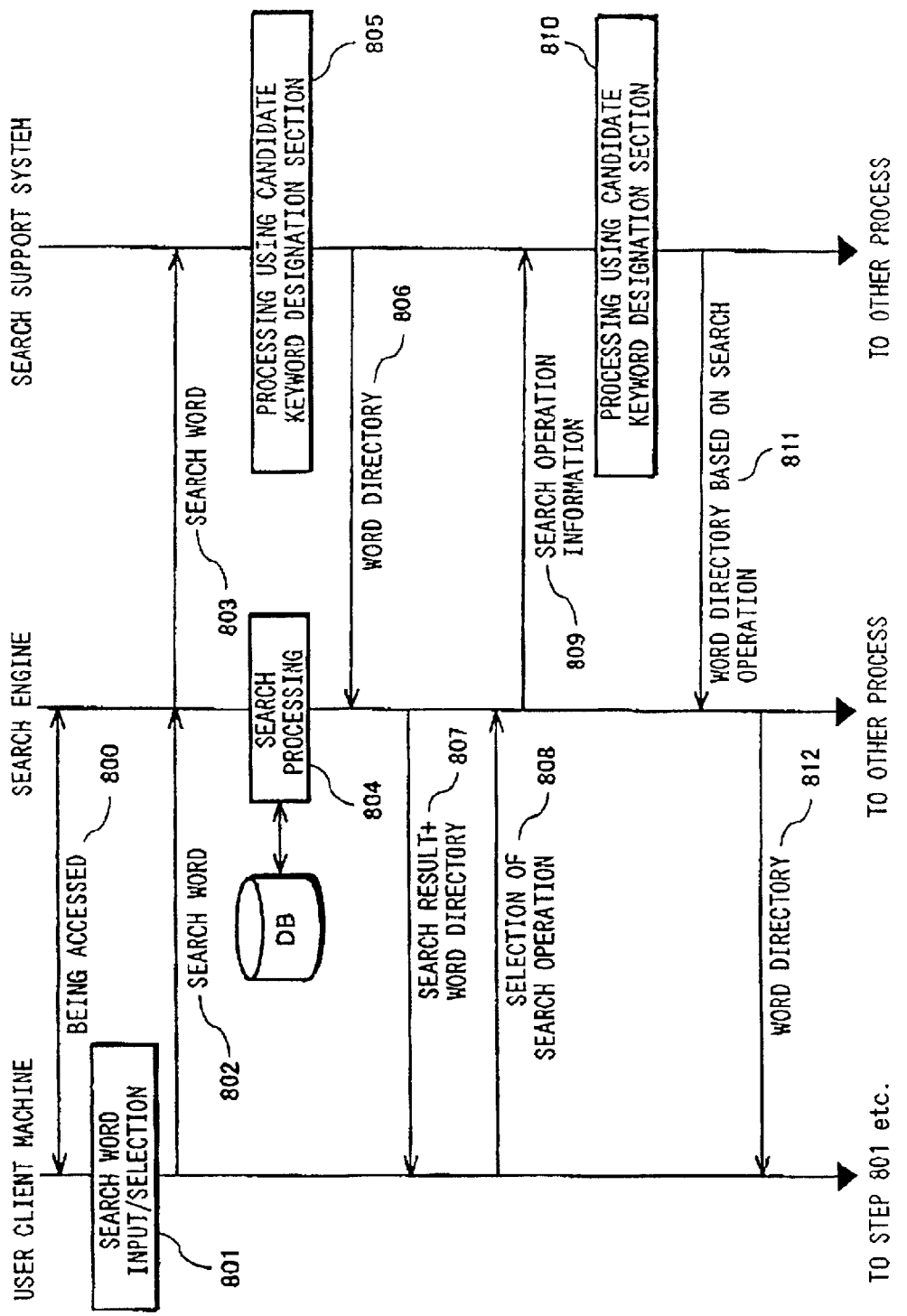
FIG. 8 is a flowchart showing input of search words and operation of a search engine and retrieval support system of the second embodiment in response to this input.

FIG. 8 is a flowchart showing input of search words by a user from a client machine, and operation of a search engine 31 and retrieval support system 100 of the second embodiment in response to this input. As shown in FIG. 8, in a state where the client machine and the search engine 31 are being accessed (step 800), if the user operates an input device such as a keyboard to input search words, or alternatively if specified words are selected from a list of search words displayed (step 801), the search words are transmitted to the search engine 31 (step 802). These search words are also transmitted to the retrieval support system 100 via the search engine 31 (step 803).

In the search engine 31, processing is carried out to search for web pages containing the search words (step 804).

On the other hand, processing using the candidate keyword designation section 150 is carried out in the retrieval support system 100 (step 805). Here, processing that is substantially the same as in FIG. 5 is carried out. In the hash acquisition section 44, a hash "Con{search word}" is acquired, and "infre{search word}, {word}" is calculated in the index calculating section 146. Also, in the directory creation section 48 occurrences of infer described above that are larger than a specified value are added to the word directory. It is also preferable to have a structure where presentation is such that entries in the word directory are shown in order from entries having a large value.

Word directories obtained by the retrieval support system 100 are transmitted to the search engine 31. The search engine 31 addresses and transmits search results and word directories to the client machine (step 807).

In the client machine, candidate keywords contained in the search results and word directories are presented, and after they have been referred to by the user, the user selects a specified search operation from a list of search operations contained in information presented from the search engine 31 or acquired by opening a menu.

In this embodiment, the following six search operations are provided.

(1) Change of Interest (Change/update)

The user's information requirements are changed, and there are cases where a search word that will probably be entered next appears not to have any association with a previous search word. That is, a change may be made to a search word that appears not to belong to the same high level concept. For example, there may be cases where a previous search words is "cost accounting", and the next search word to be input is "airline".

(2) Change to a Different Representation (Representation Chance)

There are cases where without seeing a change in the user's information requirements, the search words that are to represent these requirements are changed. For example, there may be cases where a previous search words is "Employment office" and a search word to be input next is "Job Center".

(3) Instantiating Search Words (Instantiation)

There are cases where without changing the information requirements, search words are definitely changed due to reconsideration of search strategy. For example, there may be cases where a previous search words is "television program", and a search word to be input next is an actual program name such as "CNN head line".

(4) Abstraction of Search Words (Abstraction)

There are cases where without changing the information requirements, search words are changed in an abstract manner due to reconsideration of search strategy. For example, there may be cases where a previous search words is "soccer player", and a search word to be input next is "soccer".

(5) Replacement in the Same Conceptual Layer (Replacement)

There are cases where, without changing information requirements at a higher conceptual level, there are changes in the same level to constitute different search words For example, there may be cases where a previously input search words is "East Japan Railway Company", and a search word to be input next is "West Japan Railway Company".

(6) Addition of Search Words (Addition)

There are cases where without changing the information requirements, search words are changed to other search words searched the time before due to reconsideration of search strategy. For example, there may be cases where a previous search words is "used car", and a search word to be input next is "used car |Kyushu".

A search operation selected by the user is transmitted through the search engine 31 to the retrieval support system 100 as search operation information (steps 808, 809).

Figure 9:
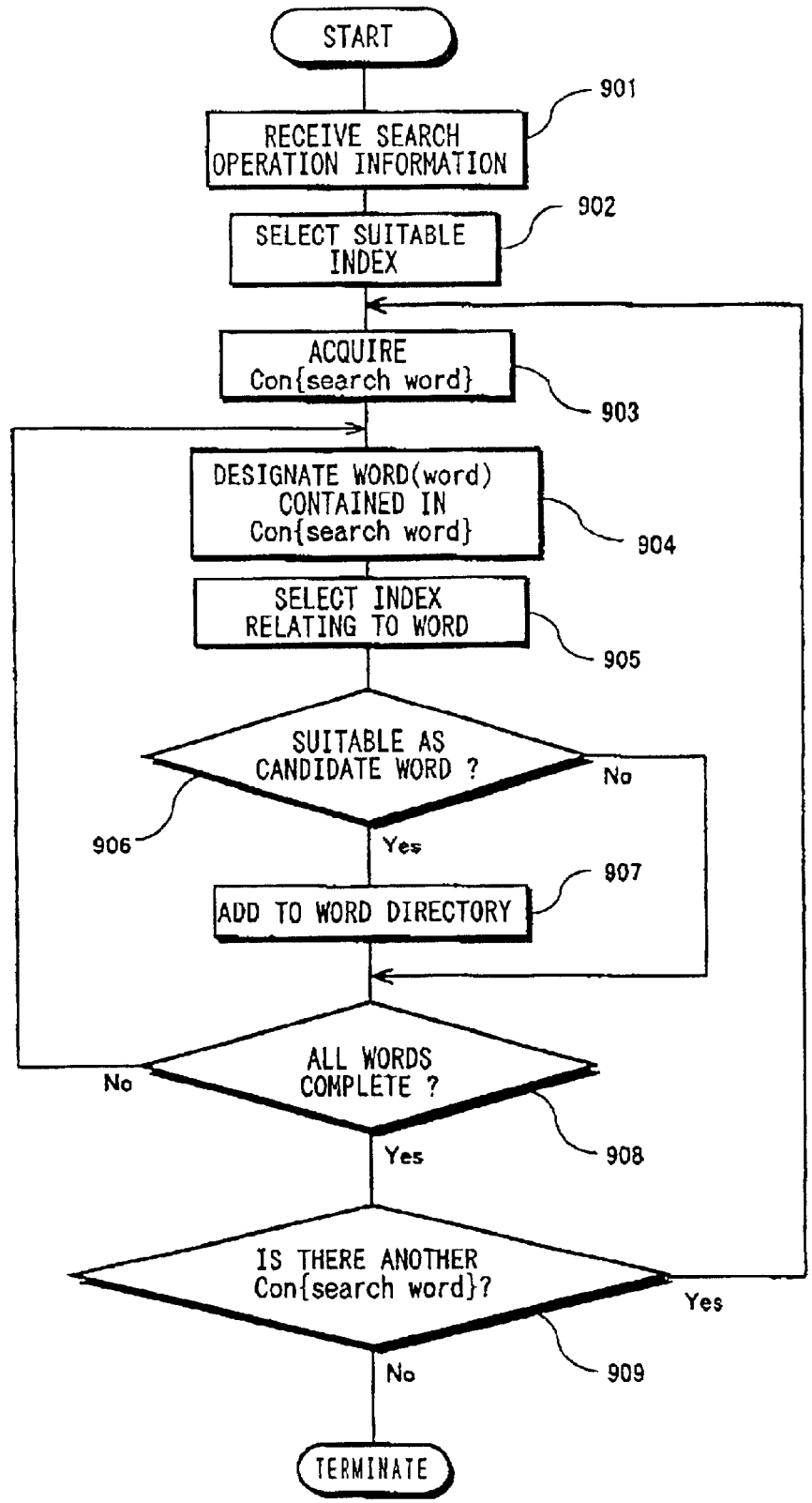
FIG. 9 is a flowchart showing processing using a candidate keyword designating section of the second embodiment.

The retrieval support system 100 again executes candidate keyword designation processing based on the search operation information. FIG. 9 is a flowchart showing candidate keyword designation processing executed here.

As shown in FIG. 9, if the index selection section 145 accepts the search operation information (step 901), it is judged which of the above describe categories (1)

(6) The Search Operation Information Falls into and the Most Applicable Index is Selected (Step 902).

FIG. 10 is a drawing showing an suitable index for a retrieval operation of this embodiment. As shown in FIG. 10, in this embodiment, with respect to "(1):change/update", "(5):replacement" and "(6):addition", the fact that "infre" that is also used in the first embodiment, namely the number of times a word has been used as a keyword within a hash for keying search words, is suitable for adoption will be understood from the inventors analysis.

Also, in "(2):representation change", "(3): instantiation" and "(4): abstraction", as described in the following, separation between search words that are keys within a search sequence and keywords for which determination will be made as to whether or not they will constitute candidates, and cumulative frequency of positions of "word" are taken into consideration. In more detail, analysis by the inventor of the present invention shows that it is appropriate for the above mentioned (2)–(4) to respectively use "avema", "aveaa" and "aveba".

Here, aveaa (aveaa{key}, {word}) means, for a key "key" that is a search word, the average position where a keyword "word" contained in that hash appears behind in the search sequence. Aveba (aveba{key}, {word}) means, for a key "key", the average position where a keyword "word" contained in that hash appears in front in the search sequence. Further, avema (avema{key}, {word}) means, for a key "key", the cumulative frequency of a position where a keyword "word" contained in that hash appears within the search sequence.

Next, the hash acquisition section 44 acquires a hash "Con{search word}" containing the search words (step 903). A "word" contained in the hash "con{search word}" is then acquired (step 904) and the index calculating section 146 calculates an index value of an index selected with respect to the "word" (step 905). It is then judged whether or not this is suitable as a keyword candidate (step 906). If it is suitable (Yes in step 906), that words is added to the word directory (step 907).

This kind of processing in steps 904–907 is executed with respect to all occurrences of "word" contained in the particular hash "Con{search word}" (refer to step 908). Also, if other "Con{search word}" exist in the hash DB 40, processing from steps 903–908 is also repeated for these (refer to step 909).

In doing this, a word directory associated with the user's search operation is acquired and this word directory is transmitted to the client machine via the search engine 31. In this way, it is possible for the user to be presented with candidate keywords conforming to the objective the user wishes to proceed with upon reference to initial search results etc.

According to this embodiment, an appropriate index is used to create a candidate keyword directory (word directory) based on a user's search operation, and this candidate word directory is presented at the user side. Accordingly, it is possible for the user to further increase the possibility of keywords conforming to the objective which he/she wishes to pursue appearing in the directory, and it becomes possible to select search words appropriate to the user and to support the acquisition of appropriate web pages.

Next, the present invention will be described based on creation of a word directory relating to the case of adding, search words. Selection of candidate words to be added to original search words takes note of a co-occurrence relationship for a list of keywords in a URL. For example, with a URL including a particular keyword "A", a designated document $D_A$ is considered.

With the present invention, tf*idf is used as an index for estimating keywords (word) that on the one hand appear with high frequency in the document $D_A$, but on the other hand do not appear often in other documents. Here, $tf(D_A, word_A)$ =(Number of URLs containing keyword (word) for $D_A$/number of URLs for document $D_A$ containing keyword "A")

$idf(word_A)$=log (total number of URLs in DB/number of URLs for documents containing keyword (word))+1

The above described tf*idf can be determined as the frequency of keywords (word) co-occurring in sets of URLs containing keyword A. Accordingly, it is possible to make words for which this index is larger than a specified threshold value candidate keywords to be added to the keyword "A".

Figure 11:
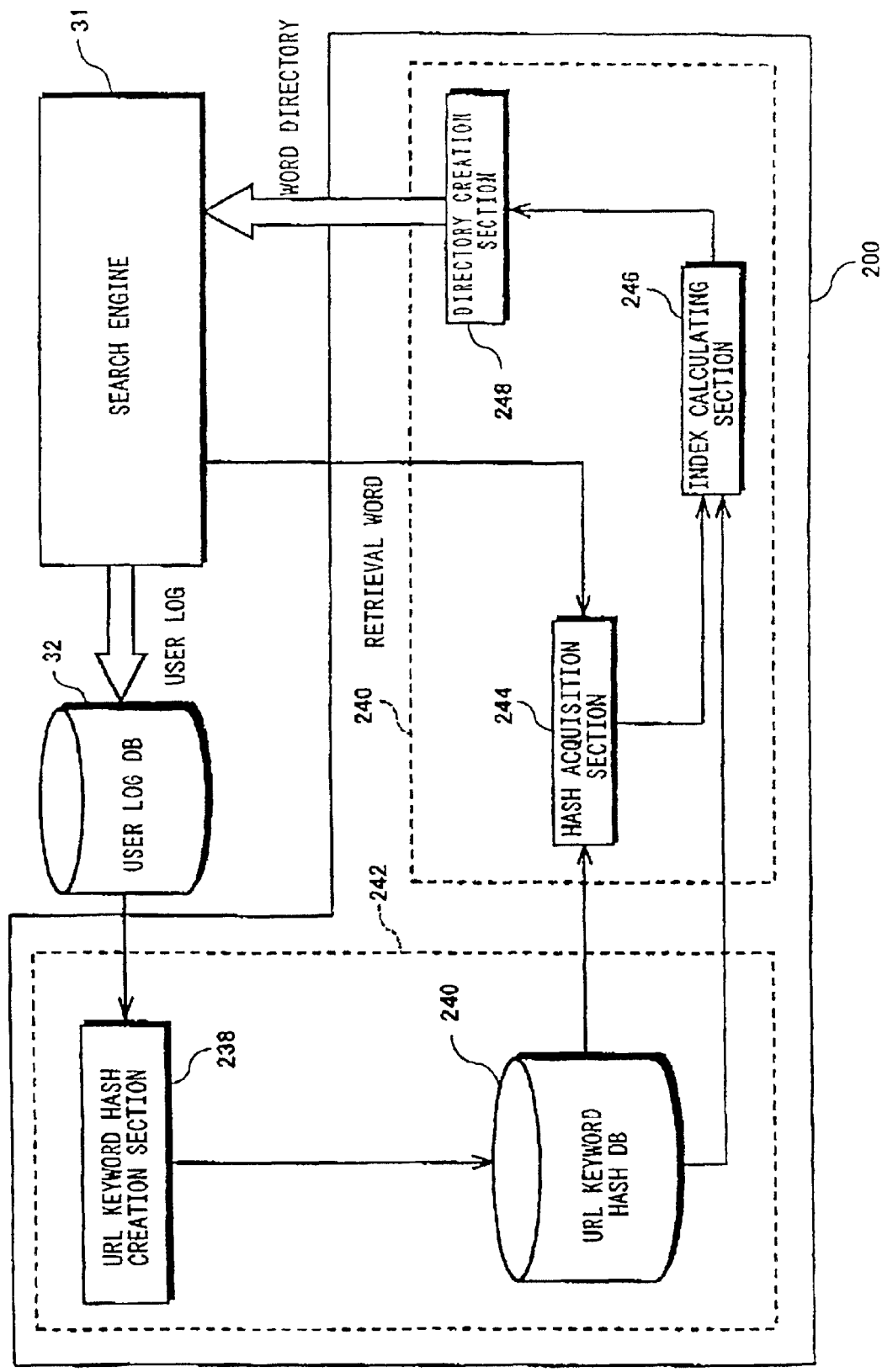
FIG. 11 is a block diagram showing functions of the information retrieval support system of a third embodiment.

FIG. 11 is a functional block diagram of the information retrieval support system of a third embodiment. As shown in FIG. 11, the retrieval support system 200 comprises a URL keyword hash creation section 238 for creating a hash made up of keywords for each URL, based on data from the user log DB 32, and a URL keyword DB 240 for storing created URL keyword hashes. These components constitute a preprocessing section 242.

The retrieval support system 200 also comprises a hash acquisition section 244 for acquiring necessary hashes by searching the URL keyword hash DB 240 by referencing search words supplied from a search engine 31, an index calculating section 246 for calculating indexes comprising the above described "tt*idf", and a directory creation section 248 for creating a word directory based on the calculated indexes. These sections from the hash acquisition section 244 to the directory creation section 248 constitute a candidate keyword designation section 250.

For a particular URL, the URL keyword hash creation section 238 creates a hash made up of keywords used in order to locate web pages of the URL. For example, in order to arrive at a web page called "cultivation of watermelons" having a particular URL "* * * .com", if keywords "fruit", "summer", "watermelon" and "cultivation" are being used, a hash relating to that URL becomes {fruit, summer, watermelon, cultivation}. The URL keyword hash creation section 238 creates a hash so as to make groups of keywords used element, for each URL, and the hashes are stored in the URL keyword hash DB 240.

Figure 12:
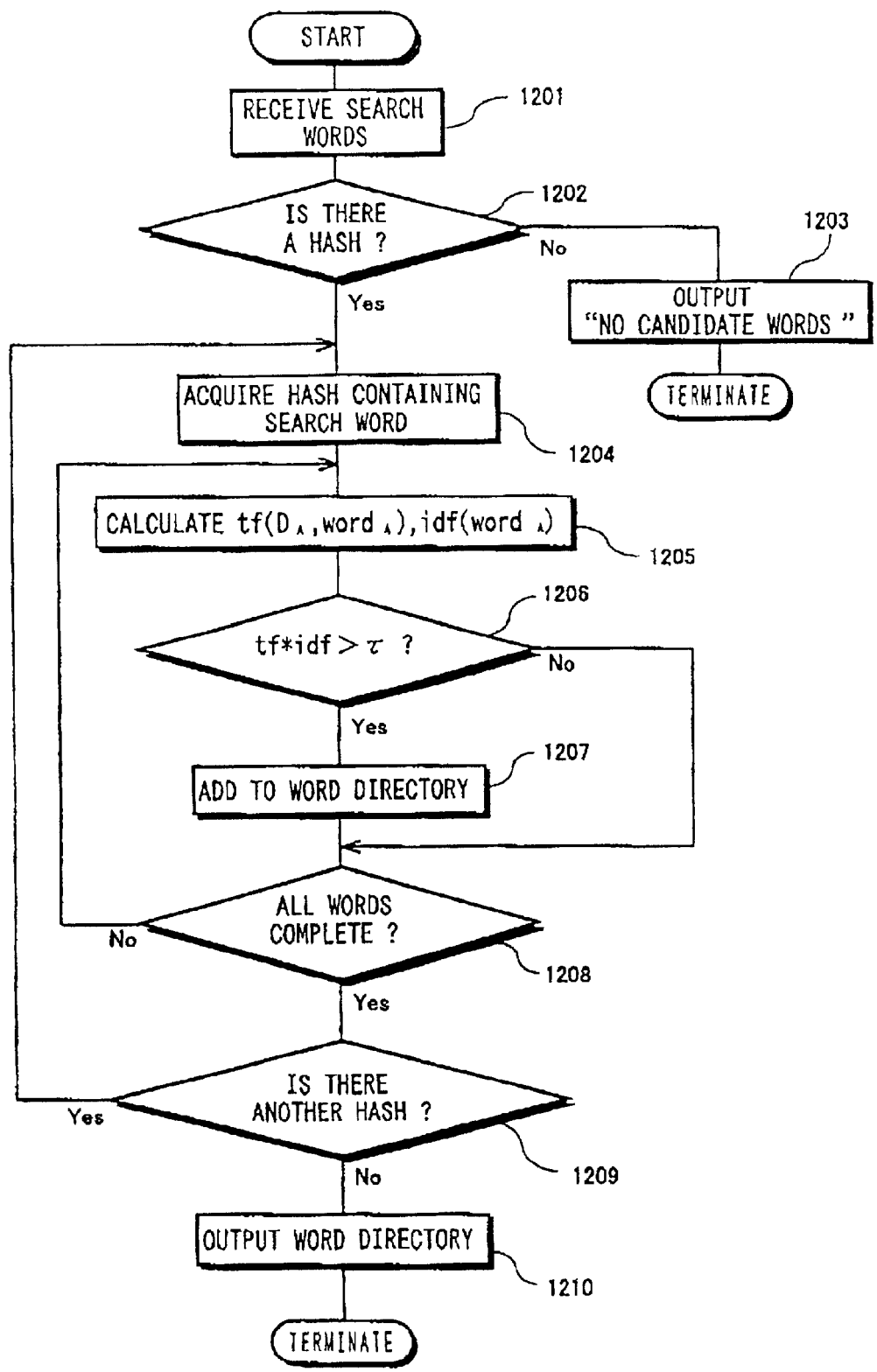
FIG. 12 is a flowchart showing processing using a candidate keyword designating section of the third embodiment.

Next, processing by the candidate keyword designation section 250 of the third embodiment will be described with reference to the flowchart of FIG. 12. When the hash acquisition section 244 receives a search word from the search engine 31 (step 1201) it is determined whether or not there is a hash containing that search word "A" as an element (step 1202). If "No" is determined in step 1202, data representing "no candidate words" is sent to the search engine 31 (step 1203).

On the other hand, if "Yes" is determined in step 1202, the hash acquisition section 244 acquires a hash containing the search word "A" from the URL keyword hash DB 240 (step 1204).

Next, for a keyword "word A" different from the keyword "A" contained in the hash, $tf(D_A, word_A)$ and $idf(word_A)$ are calculated (stop 1205). The directory creation section 248 then determines whether or not an index (tf*idf) relating to the $word_A$ is larger than a specified threshold value τ (step 1206), and if it is larger (Yes in step 1206) the keyword "$word_A$" is added to the word directory (step 1207).

The processing in steps 1205–1207 described above is executed for all keywords contained in the hash (see step 1208). Also, if another hash containing the search word "A" exists, processing of steps 1204–1208 is also executed for this hash (see step 1209). A word directory created with the above described processing is sent to the search engine 31 (step 1210).

In the word directory shown in FIG. 6(b), candidate keywords "fishing information+weather" (see reference numeral 630) and "fishing information+Shioyazaki" (see reference numeral 631) positioned below "fishing information" (see reference numeral 611) represent examples of the case where candidate words "weather" or "Shioyazaki" to be added to the search word "fishing information" have been created in accordance with the above described processing. In this way, according to the third embodiment, keywords for a filtered search, or search within results, are extracted based on co-occurrences of keywords within pages having the same URL, and these keywords can be presented to a user. Accordingly, it becomes possible for a user to perform an appropriate filtered search, or search within results.

The present invention is not limited to the above described embodiments, and various modifications are possible within the scope of the invention as disclosed in the appended claims, and it goes without saying that these modifications also fall within the scope of the present invention.

For example, in the above described first embodiment, a hash called From{key(key)} is used, while in the second embodiment a hash called Con{key(key)} is used, but hashes that can be used are not limited to this, and it is also possible to use those such as described in the following.

(1) To{key(key)}

This is for storing a keywords that were used immediately before. For example, when a search sequence is word {$ID_n$}={food, Japanese food, raw fish, sushi, eel, grilled eel}, if the key "key" is made "raw fish" it becomes To{raw fish}={Japanese food}.

(2) Mul{key(key)}

This is for storing keywords used before and after a key, and for the above described search sequence word{$ID_n$}, it becomes Mul{raw fish}={Japanese food, sushi}.

(3) Acon{key(key)}

This is for storing a keyword appearing after a key. With the search sequence word {$ID_n$} above, it becomes Acon{raw fish}={sushi, eel, grilled eel}.

(4) Bcon{key(key)}

This is for storing keywords appearing before a key. With the above described search sequence word {$ID_n$}, it becomes Bcon{raw fish}={food, Japanese food}.

(5) Econ {key(key)}

This is for storing the final keyword, and in the search sequence word {$ID_n$} above, it becomes Bcon{raw fish}={grilled eel}.

Also, in the above described embodiments, indexes such as "fre", "infre", "aveaa" etc. are used, but the present invention is not limited to these indexes, and as long as a search is keyed in to the hash and the appearance of keywords contained in the hash is represented, it goes without saying that other indexes can be used.

Obviously it is also possible to have a system that is a combination of the support system of the first embodiment or the second embodiment combined with the support system of the third embodiment. In this way, it is possible to present suitable keyword candidates in response to both change and addition of search words.

Also, in the above described embodiments, a word directory showing candidate keywords hierarchically based on search words input by a user is created in cooperation with the search engine 31, but the present invention can also be used as described below as well as in the embodiments.

For example, in a shopping arcade site, a product name is used instead of the search words of the above described embodiments, and instead of the search sequence a purchasing history sequence, holding information such as the names of items that a consumer has purchased in the shopping arcade, is used. In this way, a consumer who is purchasing a particular product can be presented with an index of a directory of products they are likely to want to purchase together with the product in question. It goes without saying that the present invention can also be used when searching products.

The present invention can also be applied to web page structures. In this case, with respect to a site having a plurality of pages, a reading sequence showing a history of pages within the site that have been read by a user is used instead of the search sequence. For example, if a site administrator indexes particular pages, it is possible to present a directory of pages that are desired to be accessed next. In this way, it is possible for the administrator to know the structure of a web page that is easy for a user to see (in the order in which users are viewing pages). It is also possible to have a structure where the structure of web pages can be changed automatically to conform with the page directory.

Also, in this specification, the function of one means can be realized by two or more physical means, and the functions of two or more means can be realized by a single physical means.

According to the present invention, it is possible to provide a system that appropriately presents a set of keyword candidates having orientation, with keywords input by a user as an origin, and can support acquisition of desired information as a result of a user appropriately changing or adding keywords.

What is claimed is:

1. An information retrieval support method for presenting candidate words to be input after an input word, comprising the steps of:

storing a group of input words, that have been input as a target for a user, as sequences in a sequence database;

storing certain words in a hash database made up of keyed hashes based on the stored sequences;

acquiring hashes to key appropriate input words from the hash sequence database in response to words input by the user;

calculating an index relating to words constituting a hash;

arranging the appropriate words in a word directory whose root corresponds to the keyed word in the event that the appropriate words satisfy a specified condition; and a step of outputting the created word directory, wherein the hash words following a word constituting a key within a sequence as hash elements, an index has a posterior probability P (word$_i$ |KEY) expressing an appropriate word "word$_i$" when a key "KEY" is known and a prior probability P(word)$_i$) expressing before the key is known, and wherein the posterior probability P (word$_i$ |KEY)>the prior probability P(word$_i$).

2. A method as defined in claim 1, further comprising the steps of:

receiving information representing the user's retrieval operation; and selecting a suitable index according to the information.

3. A method as defined in claim 2, characterized in that said index preferably has any of: (1) a change or update indicating a change in interest by the user; (2) a representation change indicating that word representation has changed; (3) instantiation indicating that a word to be input next will instantiate a preceding input word; (4) abstraction indicating that a word to be input next will abstract a preceding input word; (5) replacement indicating that there has been replacement in the same concept layer; and (6) addition indicating addition of words.

4. An information retrieval support method, for presenting candidate words to be subsequently input for input words, comprising the steps of:

storing a set of input words input by a user in a sequence database as a sequence;

storing a hash that has keyed the selected input words in the created hash database based on the stored sequence, wherein the hash has words following a word constituting a key within a sequence as hash elements, an index has a posterior probability P (word$_i$ |KEY) expressing an appropriate word "word$_i$" when a key "KEY" is known and a prior probability P(word$_i$) expressing before the key is known, and wherein the posterior probability P (word$_i$ |KEY)>the prior probability P(word$_i$);

acquiring the hash for keying the input words from the hash database in response to word input by the user;

arranging the words in a word directory whose root is the keyed word when the words satisfy a specified condition;

outputting the created word directory, a step of receiving information indicating a retrieval operation of the user upon a user referencing the word directory;

selecting an appropriate index in accordance with the information;

calculating a selected index with respect to words contained in the hash;

creating a retry word directory again by arranging the words, in the word directory whose root corresponds to the keyed word, when the words satisfy the specified condition; and outputting the recreated word directory.

5. An information retrieval support method for presenting candidate words to be subsequently input for input words, comprising the steps of:

creating a hash made up of sets of input words used to retrieve a particular item and storing this hash in a database, wherein the hash has words following a word constituting a key within a sequence as hash elements, an index has a posterior probability P (word$_i$ |KEY) expressing an appropriate word "word$_i$" when a key "KEY" is known and a prior probability P(word$_i$) expressing before the key is known, and wherein the posterior probability P (word$_i$ |KEY)>the prior probability P(word$_i$);

acquiring the hash for keying the input words from the hash database in response to words input by the user;

calculating an index indicating co-occurrence relation after input with respect to words contained in the hash;

arranging the words in a word directory whose root corresponds to the keyed word as a candidate word for adding the words to input words, in the event that the words satisfy a specified condition; and outputting the created word directory.

6. An information retrieval support system, for presenting candidate words to be subsequently input for input words, comprising:

retrieval sequence creation means for creating a retrieval sequence of a set of input words input by a user arranged in chronological order;

a retrieval sequence database for storing storage sequences;

a search sequence database for storing search sequences;

hash creation means for creating a hash that has keyed particular input words based on sequences stored in the retrieval sequence database;

hash acquisition means for acquiring a hash for keying the input words from the hash database in response to word input by the user;

index calculating means for calculating an index relating to words contained in a hash; and directory creation means for creating a word directory by arranging the input words in a word directory whose root corresponds to the keyed word when the words satisfy a specified condition, wherein the created word directory is output, wherein the hash has words following a word constituting a key within a sequence as hash elements, an index has a posterior probability P (word$_i$ |KEY) expressing an appropriate word "word$_i$" when a key "KEY" is known and a prior probability P(word$_i$) expressing before the key is known, and a condition is that the posterior probability P (word$_i$ |KEY)>the prior probability P(word$_i$).

7. A system as defined in claim 6, further comprising:

index selection means for receiving information representing the user's retrieval operation, and for selecting a suitable index according to the information.

8. A system as defined in claim 7, characterized in that said index preferably has any of: (1) a change or update indicating a change in interest by the user; (2) a representation change indicating that word representation has changed; (3) instantiation indicating that a word to be input next will instantiate a preceding input word; (4) abstraction indicating that a word to be input next will abstract a preceding input word; (5) replacement indicating that there has been replacement in the same concept layer; and (6) addition indicating addition of words.

9. An information retrieval support system, for presenting candidate words to be subsequently input as input words, comprising:

hash sequence creation means for creating a hash made up of a set of input words used to retrieve a particular item, wherein the hash has words following a word constituting a key within a sequence as hash elements, an index has a posterior probability P (word$_i$ |KEY) expressing an appropriate word "word$_i$" when a key "KEY" is known and a prior probability P(word$_i$) expressing before the key is known, and wherein the posterior probability P (word$_i$ |KEY)>the prior probability P(word$_i$);

a hash database for storing created hashes;

hash acquisition means for acquiring a hash for keying the input words from the hash database in response to word input by the user;

index calculating means for calculating an index indicating a co-occurrence relationship subsequent to input; and word directory creation means for creating a word directory by arranging candidates of words for adding the words to input words in a word directory whose root corresponds to the keyed word when the words satisfy a specified condition.

10. A computer program which causes a computer to execute steps for presenting candidate words to be input after an input word, said computer program comprising the steps of:

storing a group of input words, that have been input as a target for a user, as sequences in a sequence database;

storing certain words in a hash database made up of keyed hashes based on the stored sequences;

acquiring hashes to key appropriate input words from the hash sequence database in response to words input by the user;

calculating an index relating to words constituting the hash;

arranging the appropriate words in a word directory whose root corresponds to the keyed word in the event that the appropriate words satisfy a specified condition; and a step of outputting the created word directory, wherein the hash has words following a word constituting key within a sequence as hash elements, an index has a posterior probability P (word$_i$ |KEY) expressing an appropriate word "word$_i$" when a key "KEY" is known and a prior probability P(word$_i$) expressing before the key is known, and wherein the posterior probability P (word$_i$ |KEY)>the prior probability P(word$_i$).

11. A computer program as defined in claim 10, further comprising the steps of;

receiving information representing the user's retrieval operation; and selecting a suitable index according to the information.

12. A computer program which causes a computer to execute steps, for presenting candidate words to be subsequently input for input words, said computer program comprising the steps of:

storing a set of input words input by a user in a sequence database as a sequence;

storing a hash that has keyed the selected input words in the created hash database based on the stored sequence, wherein the hash has words following a word constituting a key within a sequence as hash elements, an index has a posterior probability P (word$_i$ |KEY) expressing an appropriate word "word$_i$" when a key "KEY" is known and a prior probability P(word$_i$) expressing before the key is known, and wherein the posterior probability P (word$_i$ |KEY)>the prior probability P(word$_i$);

acquiring the hash for keying the input words from the hash database in response to word input by the user;

arranging the words in a word directory whose root is the keyed word when the words satisfy a specified condition;

outputting the created word directory, and a step of receiving information indicating a retrieval operation of the user upon a user referencing the word directory;

selecting an appropriate index in accordance with the information;

calculating a selected index with respect to words contained in the hash;

creating a retry word directory again by arranging the words, in the word directory whose root corresponds to the keyed word, when the words satisfy the specified condition; and outputting the recreated word directory.

13. A computer program which causes a computer to execute steps, for presenting candidate words to be subsequently input for input words, said program comprising the steps of:

creating a hash made up of sets of input words used to retrieve a particular item and storing this hash in a database, wherein the hash has words following a word constituting a key within a sequence as hash elements an index has a posterior probability P (word$_i$ |KEY) expressing an appropriate word "word$_i$" when a key "KEY" is known and a prior probability P(word$_i$) expressing before the key is known, and wherein the posterior probability P (word$_i$ |KEY)>the prior probability P(word$_i$);

acquiring the hash for keying the input words from the hash database in response to words input by the user;

calculating an index indicating co-occurrence relation after input with respect to words contained in the hash;

arranging the words in a word directory whose root corresponds to the keyed word as a candidate word for adding the words to input words, in the event that the words satisfy a specified condition; and outputting the created word directory.

14. An information retrieval support method for presenting candidate words to be input after an input word, the method comprising the steps of:

(a) storing a group of input words, that have been input as a target for a user, as sequences in a sequence database;

(b) storing certain words in a hash database made up of keyed hashes based on the stored sequences;

(c) acquiring hashes to key appropriate input words from the hash sequence database in response to words input by the user;

(d) calculating an index relating to words constituting the hash;

(e) arranging the appropriate words in a word directory whose root corresponds to the keyed word in the event that the appropriate words satisfy a specified condition;

(f) a step of outputting the created word directory;

(g) receiving information representing the user's retrieval operation; and (h) selecting a suitable index according to the information; wherein the index preferably has any of: (1) a change or update indicating a change in interest by the user; (2) a representation change indicating that word representation has changed; (3) instantiation indicating that a word to be input next will instantiate a preceding input word; (4) abstraction indicating that a word to be input next will abstract a preceding input word; (5) replacement indicating that there has been replacement in the same concept layer; and (6) addition indicating addition of words; and when an index indicating the number of items using keywords in a hash for keying input words is used with respect to (1), (5) and (6), a cumulative number of positions where a keyword containing that hash appears within a retrieval sequence, for the key, is used as the index with respect to (2), an average of positions where keywords containing that hash appears after the retrieval sequence is used as the index with respect to (3), and an average of positions where keywords containing that hash appears before the retrieval sequence is used as the index with respect to (4).

15. An information retrieval support system, for presenting candidate words to be subsequently input for input words, comprising:

(a) retrieval sequence creation means for creating a retrieval sequence of a set of input words input by a user arranged in chronological order;

(b) a retrieval sequence database for storing storage sequences;

(c) a search sequence database for storing search sequences;

(d) hash creation means for creating a hash that has keyed particular input words based on sequences stored in the retrieval sequence database;

(e) hash acquisition means for acquiring a hash for keying the input words from the hash database in response to word input by the user;

(f) index calculating means for calculating an index relating to words contained in a hash;

(g) directory creation means for creating a word directory by arranging the input words in a word directory whose root corresponds to the keyed word when the words satisfy a specified condition, wherein the created word directory is output; and (h) index selection means for receiving information representing the user's retrieval operation, and for selecting a suitable index according to the information, wherein the index preferably has any of: (1) a change or update indicating a change in interest by the user; (2) a representation change indicating that word representation has changed; (3) instantiation indicating that a word to be input next will instantiate a preceding input word; (4) abstraction indicating that a word to be input next will abstract a preceding input word; (5) replacement indicating that there has been replacement in the same concept layer; and (6) addition indicating addition of words; and wherein the index selection means selects an index indicating the number of items using keywords in a hash for keying input words is used with respect to (1), (5) and (6), a cumulative number of positions where a keyword containing that hash appears within a retrieval sequence, for the key, is used as the index with respect to (2), an average of positions where keywords containing that hash appears after the retrieval sequence is used as the index with respect to (3), and an average of positions where keywords containing that hash appears before the retrieval sequence is used as the index with respect to (4).

16. An information retrieval support system, for presenting candidate words to be subsequently input for input words, the system comprising:

(a) retrieval sequence creation means for creating a retrieval sequence of a set of input words input by a user arranged in chronological order;

(b) a retrieval sequence database for storing storage sequences, wherein the retrieval sequence database is connected to receive the retrieval sequence from the retrieval sequence creation means;

(c) a search sequence database for storing search sequences, the search sequence connected to send input to the retrieval sequence creation means;

(d) hash creation means for creating a hash that has keyed particular input words based on sequences stored in the retrieval sequence database, the hash creation means is connected to receive input from the retrieval sequence database and to send the created hash to a hash database;

(e) hash acquisition means for acquiring a hash for keying the input words from the hash database in response to word input by the user, wherein the hash acquisition means is connected to receive input from the hash database;

(f) index calculating means for calculating an index relating to words contained in a hash, wherein the index calculating means is connected to receive input from the hash acquisition means; and (g) directory creation means for creating a word directory by arranging the input words in a word directory whose root corresponds to the keyed word when the words satisfy a specified condition, wherein the directory creation means is connected to receive input from the index calculating means and is connected to send the created word directory as output to the search sequence database; and (h) index selection means for receiving information representing the user's retrieval operation, and for selecting a suitable index according to the received information, wherein the index selection means is connected to send input to the index calculating means; wherein the index has one or more of the following: (1) a change or update indicating a change in interest by the user; (2) a representation change indicating that word representation has changed; (3) instantiation indicating that a word to be input next will instantiate a preceding input word; (4) abstraction indicating that a word to be input next will abstract a preceding input word; (5) replacement indicating that there has been replacement in the same concept layer; and (6) addition indicating addition of words; and wherein the index selection means operates to select an index indicating the number of items using keywords in a hash for keying input words is used with respect to (1), (5) and (6), a cumulative number of positions where a keyword containing that hash appears within a retrieval sequence, for the key, is used as the index with respect to (2), an average of positions where keywords containing that hash appears after the retrieval sequence is used as the index with respect to (3), and an average of positions where keywords containing that hash appears before the retrieval sequence is used as the index with respect to (4).

* * * * *